INVENTOR.
Pablo August
BY Michael S. Striker
Attorney

Jan. 15, 1963  P. AUGUST  3,073,118
ROTARY PISTON INTERNAL COMBUSTION ENGINE WITH
TWO-STAGE COMPRESSION
Filed Dec. 5, 1960  4 Sheets-Sheet 3

INVENTOR.
Pablo August
BY
Michael S. Stalker
Attorney

United States Patent Office 3,073,118
Patented Jan. 15, 1963

3,073,118
ROTARY PISTON INTERNAL COMBUSTION ENGINE WITH TWO-STAGE COMPRESSION
Pablo August, Directorio 130, Bernal, Argentina
Filed Dec. 5, 1960, Ser. No. 73,842
Claims priority, application Germany Sept. 20, 1960
8 Claims. (Cl. 60—39.61)

My present invention relates to internal combustion engines of the rotary piston type and more particularly refers to a novel two-stage compression internal combustion engine of the rotary piston type capable of operating as multiple fuel engine with high efficiency.

The hitherto known so-called rotary piston engines, except one, were practically unable to give satisfactory results and even in the case of said exception the internal combustion engine, which comprises a rotating piston body, presents certain difficulties in construction and tightness.

The problems so far encountered with all hitherto proposed rotary piston engines consist, on the one hand, in a good and efficient tightness at high pressure and, on the other hand, in a design or construction suitable for an operation on the four-stroke cycle principle. High compression ratios and correspondingly high pressures, are however, required if it is desired to obtain with the rotary piston engine the economy and efficiency of a diesel engine. These problems have not been solved up to date.

My present invention aims at not only solving these problems, but also providing a novel rotary piston internal combustion engine of the following advantageous characteristics:

(1) Small size.
(2) Light weight.
(3) Low cost of production.
(4) High power.
(5) Economy, efficiency.
(6) Multiple fuel operation; auto-ignition with or without fuel injection or ignition by spark plugs.

In accordance herewith the main object of the invention is to provide a rotary piston internal combustion engine with two-stage compression, characterized in that a main compression stage comprising a reciprocating piston is provided between a rotary piston pre-compression stage and a rotary piston expansion stage.

The novel combination of the pre-compression stage with a reciprocating piston main compression stage offers the advantage of a more economical development of the compression process and of a higher efficiency of tightness, particularly in the main and high pressure compression stage wherein the reciprocating piston may be provided with air-tight sealing piston rings.

The said novel combination is further advantageous insofar as the reciprocating piston of the main compression stage in co-operation with a reciprocating counter-piston operates as control means, instead of valves, for controlling the passages which establish the communication between the pre-compression stage and the main compression stage and between the latter and the expansion stage.

An additional advantageous characteristic of the invention consists in that the combustion chamber of the engine is formed by the cylinder space of the main compression stage between the said two reciprocating pistons of which the counter-piston is adjustable in its operation so as to ensure in each case the most ideal development of the compression and expansion processes and to ensure at the same time complete evacuation of the combustion chamber.

The said counter-piston may be spring-loaded or may be mechanically controlled in its operation, the arrangement being in each case such that a prolonged combustion with simultaneous enlargement of the combustion chamber is obtained with the advantageous result that a constant pressure combustion is ensured and that peak pressures are avoided.

The adjustability of the said counter-piston affords the possibility of operating the engine with different fuels and of rendering the engine operation economical. In as far as the economy and further advantageous features of the present invention are concerned, the same will become evident in the following description of a preferred embodiment of the invention as illustrated by way of example on the accompanying drawings, whereon:

FIGS. 4a–g schematically shows the operation of the internal combustion engine according to the invention.

The internal combustion engine of the rotary piston type according to the invention essentially comprises a first or pre-compression stage A, a second or main compression stage B and an expansion stage C (FIG. 1), the first compression stage and the expansion stage comprising each a rotary piston, whereas the main compression stage comprises a reciprocating piston and the relative arrangement of these three stages affords the possibility of constructing relatively small engines of relatively high power, the illustrated embodiment at a scale of 1:2 having a power of about 100 H.P.

Figure 3:
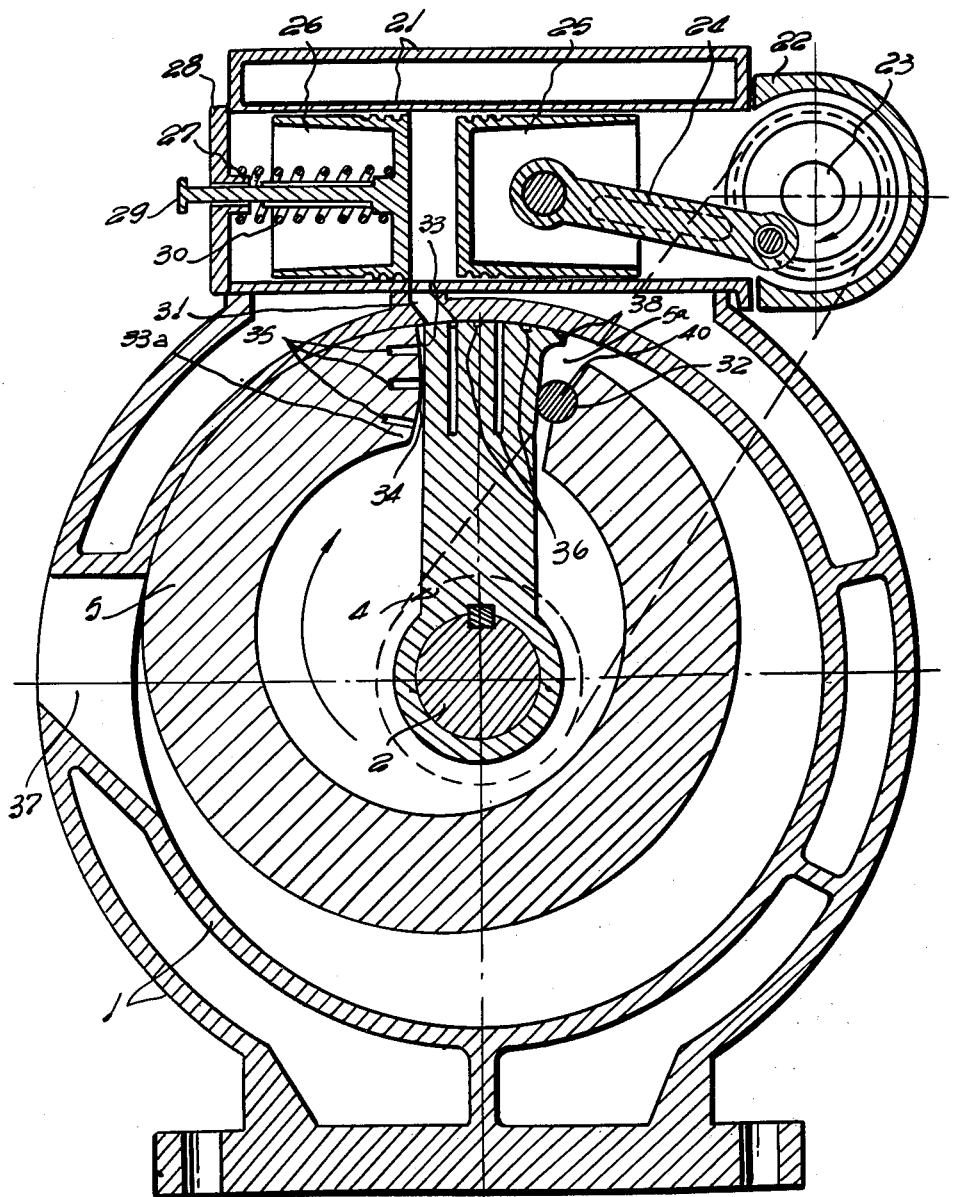
FIG. 3 is a cross sectional view of the expansion stage of the engine.

In the casing 1 of the expansion stage C the driving shaft 2 is centrallly arranged and suitably mounted at one side in the front wall 3 of said casing. A rotary blade piston 4 is fixedly mounted on the driving shaft 2 and extends through a slot 5a of a cylindrical rotor 5 which is eccentrically arranged in said casing 1 (FIG. 3). The hollow rotor 5 has a cylindrical extension 5b and is rotatively mounted, at one end, in the bearing 6 in the casing 1 of the expansion stage C and, at the opposite end, in a bearing 7 in the front wall 8 of the casing 9 of the pre-compression stage A.

Within the casing 9 of the pre-compression stage the rotor extension 5a carries an eccentric 10 (FIGS. 1 and 2), which in turn with the interposition of a bearing 11 carries a cylindrical piston 12 of circular motion. This circling piston 12 is provided with a recess 13 (FIG. 2) engaged by a guide member 14. The ports 15, 16 provided in the casing 9 form the inlet and outlet, respectively, of the pre-compression stage A.

The pre-compression stage A of the internal combustion engine according to the invention is preferably constituted by the compressor as disclosed and claimed in my co-pending application Serial No. 67,218.

Figure 1:
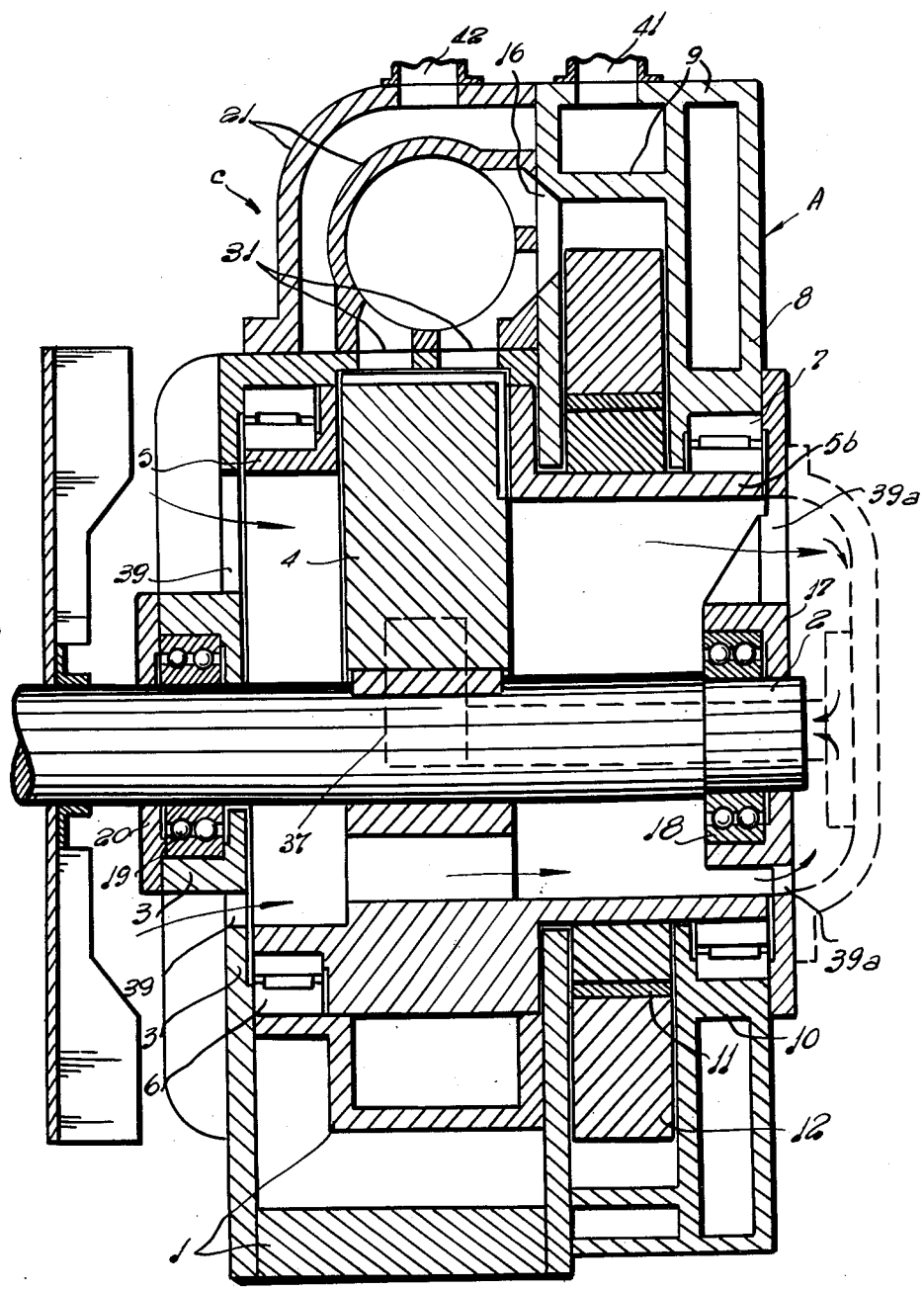
FIG. 1 is an axial sectional view of the novel internal combustion engine according to the invention.

The driving shaft 2 at the compression side is mounted in the cover member 17 by means of a ball bearing 18 and at the expansion side in the ball bearing 19 sealed by the cover plate 20 (FIG. 1).

Above the expansion stage C and adjacent the partition wall between the same and the pre-compression stage A (FIG. 1) there is provided a double wall cylinder 21 comprising a crank case 22 (FIG. 3) and constituting the main compression stage B. By means of a crankshaft 23 which in a suitable known manner is operatively connected with the driving shaft 2, and of a connecting rod 24, a piston 25 is operated for reciprocating in the cylinder 21.

The cylinder 21 further comprises a counter-piston 26 which by means of the piston rod 27 is guided in the cylinder cover 28. In the embodiment as shown the counter-piston 26 is spring-loaded as by a pressure spring 30 and its stroke is limited, for instance, by a stop member 29 provided at the free end of the piston rod 27 (FIG. 3). The operation of this counter-piston 26 may be regulated by interchanging the spring 30 or by adjusting in a known manner the pressure exerted thereby.

Instead of the spring 30, a mechanical control device may be provided for the counter-piston 26, for which purpose the counter-piston may be operatively connected with the driving shaft 2, for instance, by means of a known cam control (not shown).

Figure 2:
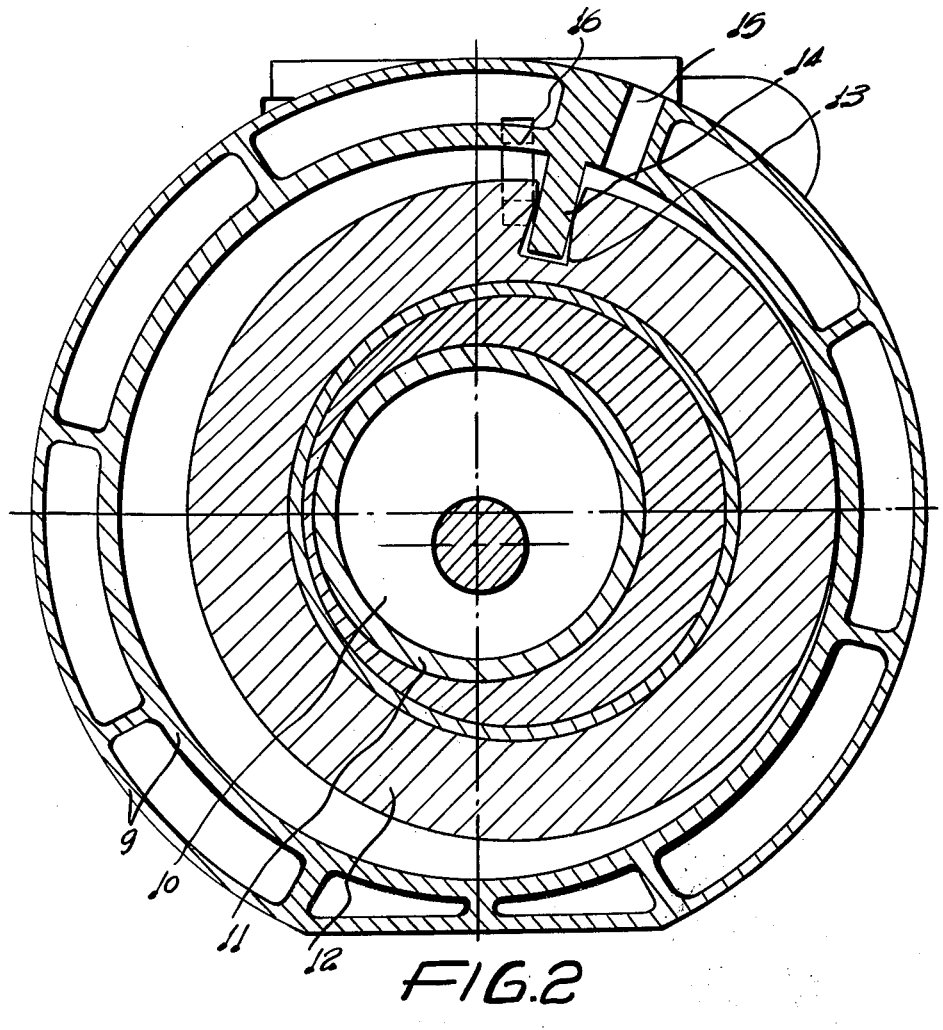
FIG. 2 is a cross sectional view of the first or pre-compression stage of the engine.

The channels 31 (FIGS. 1 and 3) establish the communication between the casing 1 of the expansion stage C and the combustion chamber formed in the cylinder 21 of the main compression stage B between piston 25 and counter-piston 26, whereas the passage 16 establishes the communication of the compression stages A and B (FIGS. 1 and 2.)

The crankshaft 23 is operated by the driving shaft 2 at a transmission rate of 1:1.

The rotary piston blade 4 operated by the driving shaft 2 and extending through the slot 5a of the rotor 5 acts upon the latter under pressure contact with a cylindrical body or rotatively mounted roller 32 provided for this purpose in the respective side wall of said slot. The pressure contact between the front side wall of the piston blade 4 and the roller 32 always maintains an air-tight seal between these parts and the fact that the cylindrical body 32 rolls on the surface of the piston blade 4 efficiently avoids the production of frictional resistance and heat.

The opposite side wall of the slot 5a of the rotor 5 forms an angular projection with the vertex 34 and with diverging wall portions 33, 33a so arranged that they form in the vertical, respectively horizontal, positions of the piston blade 4 with the rear side wall of the latter air-tight contact surfaces, whereas in the intermediate positions of said piston blade an air-tight seal is maintained by the vertex 34. The wall portions 33, 33a as well as the vertex 34 are conveniently provided with embedded sealing fillets 35, the right-angled end portions of which advantageously embrace to a small extent the ends of the rotor. Similar sealing fillets 36 are conveniently provided on the outer surface and on the end surfaces of the piston blade 4 (FIG. 1).

Finally the piston blade 4 conveniently comprises a nose portion 38 projecting in the direction of rotation and having a profile capable of filling the recess formed between the roller 32 and the outer wall portion 40 of the rotor slot 5a and of thus avoiding the formation of a dead space in the horizontal positions of the piston blade, in which positions the curve formed by said nose portion contacts the roller 32.

The exhaust opening of the expansion stage C has been indicated at 37 (FIG. 3).

The front walls of the engine casing (FIG. 1) are provided with openings 39, 39a permitting a current of refrigerating air to be blown or sucked through the engine, for instance, in the direction indicated by the arrows, by means of a ventilator (not shown) which may be fixedly mounted on the driving shaft 2, so that the rotor 5 and the blade piston 4 may be efficiently cooled.

The casings 9 and 21 finally are provided with ports 41, 42 for cooling water to be circulated through the chambers formed by double walls of said casings and to efficiently cool the compression stages A and B.

In the following explanations of the operation of the internal combustion engine according to the present invention as well as of the advantages of the same as compared with known engines, reference is simultaneously made to FIGS. 4a–g, wherein the different steps of operation are schematically illustrated by the respective positions of the pistons 25, 26 of the main compression stage B.

By the operation of the cylindrical circling piston 12 of the pre-compression stage A air or a gas mixture is sucked in through the inlet port 15, is pre-compressed and by way of the outlet passage 16 is forced into the cylinder 21. The reciprocating piston 25 and the counter-piston 26 of the main compression stage B in their initial positions (crankshaft angle 0°, FIG. 4a) maintain the passage 16 open and the channels 31 closed, respectively.

The piston 25 closes the passage 16 in its fore stroke at a crankshaft angle of 70° after the lower dead centre (FIG. 4b), the piston 12 being arranged with regard to the piston 25 in such a manner that it finishes the discharge of pre-compressed air at the moment at which the piston 25 entirely closes the passage 16. Consequently under the conditions herein referred to, $2 \times 70° = 140°$ (crankshaft angle) are available for pre-compressed air to pass from the pre-compression to the main compression stage.

At the lower dead centre of the piston 25 (FIG. 4a) in the cylinder 21 between the two pistons 25 and 26 there is a free space which is in the proportion of 1:3.8 with regard to the compression chamber of the pre-compression cylinder 9, whereas at the moment at which the piston 25 closes the passage 16 (FIG. 4b), the compression ratio is of 1:5.5. Consequently the piston 12 has to perform a precompression of 1:5.5 only. This compression ratio does not constitute at all a problem for rotary compressors and may be readily obtained therewith. On the other hand, the rotary compressor as employed according to the invention in the pre-compression stage A ensures better rates of admission and efficiency than those capable of being obtained by reciprocating piston compressors.

The main compression stage B which according to the invention comprises a reciprocating piston, however, has for the compression to higher pressures only one fourth of its normal size and a correspondingly smaller piston head area with the advantageous result that the compressing work is considerably reduced. On the other hand, the water used for refrigerating may be maintained at a considerably lower temperature than this is normally the case. This water entering at 41 first cools the passage 16 while its temperature is relatively low and by virtue hereof the temperature of the precompressed air or gas is lower than that obtainable in any known compressor. For these reasons in the two-stage compression system according to the invention compression ratios of 1:12 (FIG. 4c) for the engine operation with normal gasoline are absolutely obtainable and by virtue hereof economy and efficiency of the engine as an auto-ignition or diesel engine, a compression of 1:20 produces a counter-pressure corresponding to a compression ratio of about 1:14.

In a position of the piston 25 corresponding to a crankshaft angle of about 60° before the upper dead centre (FIG. 4d), said piston compresses at a compression ratio of about 1:20 and at this moment the injection of fuel commences if the engine operates as an auto-ignition or diesel engine.

At a position corresponding to a crankshaft angle of about 45° before the upper dead centre (FIG. 4e), the expansion produced by ignition commences with the corresponding increase in pressure.

Figure 4:
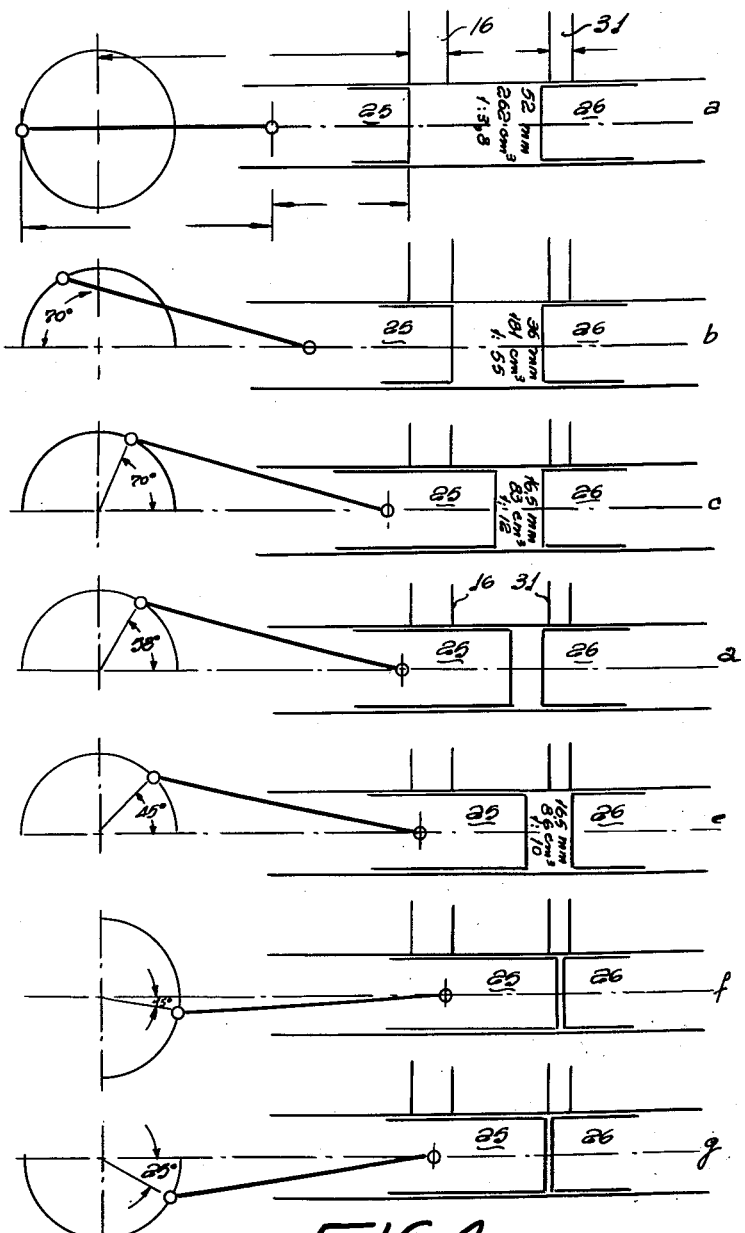

The spring 30 of the counter-piston 26 is in this case so adjusted that it does not resist the pressure built up by the piston 25 in its position shown in FIG. 4e, but permits the piston 26 to move backward. Thereby this piston 26 opens the channels 31 between the main compression stage B and the expansion stage C. Said channels 31, however, remain closed by the rotary blade piston 4 until after a rotation of the latter over an angle of about 20°, and at this moment the expanding gas enters the expansion chamber between the rotor 5 and the casing 1—in the direction of rotation—behind the blade piston 4.

Already in a position of the piston 25 corresponding to a crankshaft angle of about 15° after the upper dead point (FIG. 4f) so much gas passed from the combustion chamber in the cylinder 21 into the expansion chamber in the casing 1, that the pressure in said combustion chamber is lower than that exerted by the spring 30. Therefore, this spring urges the piston 26 towards the piston 25, forces the combustion gases out of the cylinder 21 into said expansion chamber and after doing so entirely closes the channels 31 while the piston 25 simultaneously sets back to its position at a crankshaft angle of about 25° (FIG. 4g).

An impact of the piston 26 on the piston 25 is rendered impossible by the gas existing between the same. Nevertheless the two pistons practically come in contact with one another and ensure not only a complete evacuation of the combustion chamber, but also reduce the dead space to that formed by the channels 31 which, however, with regard to the expansion chamber is of a proportion of but 1:100. Also in as far as this proportion is concerned the conditions of the engine according to the invention are considerably more advantageous than in the case of conventional diesel engines. It may finally be mentioned that the energy consumed in overpowering the pressure of the spring 30 is practically returned by the spring in its performing the evacuation of the combustion chamber by means of the piston 26.

In the expansion chamber formed between the casing 1 and the rotor 5, the combustion gases expand to 1.4–1.5 times the rate of expansion in the known internal combustion engines having reciprocating pistons, in view of that here the expansion chamber has a correspondingly larger capacity. By virtue hereof the new internal combustion engine according to the invention has a considerably higher efficiency and the temperature of the exhaust gases is for about 50% lower than that of the exhaust gases of the conventional internal combustion engines. Further, the exhaust gases may freely escape without obstruction by valves after a relatively long way of expansion and through a wide exhaust opening, so that there are no losses likely to be produced.

In as far as the tightness of the expansion stage C is concerned, it may be stated that the high pressure gases are acting upon the back of the blade piston 4 only. Therefore, a careful air-tight sealing has to be provided between the back side of the piston blade 4 and the adjacent side wall of the slot 5a of the rotor 5. The contact surfaces 33, 33a, the vertex 34 and the sealing fillets 35 proved to be able to afford the required tightness. The front side of the piston blade 4, as already set forth, acts under pressure upon the roller 32 and thereby provides for a sufficient and satisfactory tightness.

An important problem of the rotary piston internal combustion engines consists in that its rotor is excessively heated and can not be cooled in the known rotary compressors. This problem has been solved by the present invention in a very simple and efficient manner. As already stated the rotor 5 is an annular body and has a cylindrical extension 5b and the front walls of the engine casing are provided with openings 39, 39a. A ventilator (not shown) may be mounted in a known manner on the driving shaft 2 and so constructed and arranged that it improves the water cooling of the engine, that it additionally blows fresh air over the engine casing and that it finally causes cooling air through the interior of the engine as indicated by the arrows in FIG. 1, thus efficiently cooling not only the rotor 5, but also the blade piston 4. If this air current passing through the interior of the engine is caused to escape by way of the exhaust pipe, the suction produced therein by ejector effect will advantageously improve the efficiency of said ventilator.

With regard to the efficiency of the internal combustion engine according to the invention it may be stated that, if the compression space is of 1000 cm.³, the expansion chamber is of 1400 cm.³ and the dimensions of the engine casing are of 480/480/280 mm. and if the engine operates at a speed of 6000 r.p.m., its efficiency will be of about 120 H.P. If two like engine units are arranged side by side on a common driving shaft, the dimensions of the engine will be of 480/480/500 mm. and its efficiency will amount to about 240 H.P.

Also in the case of operating this engine as injector type diesel engine a speed of 6000 r.p.m. is possible by virtue of that for the injection from its beginning to its end there is available a crankshaft angle of 70°–90°. A rotary piston diesel engine according to the present invention of the dimensions of 480/480/500 mm. will surely have an efficiency of 180 H.P.

The coefficient of utilization of the air up to the smoke limit is in the engine according to the invention very high and this by virtue of that, on the one hand, a circular combustion chamber between the two pistons 25, 26 is very advantageous and, on the other hand, high pressures exist over a very large crankshaft angle, however, without loading a big crankshaft mechanism.

In the operation of the engine on the diesel principle the setting back of the counter-piston 26 e.g. under a pressure of 40 atmospheres, maintains this pressure constant until said piston after its return almost or entirely contacts the piston 25, with the result that the operative conditions and the combustion are so advantageous that the excess of combustion air may be very small and that nevertheless high peak pressures do not occur by virtue of that at each pressure increase the counter-piston sets back and thereby enlarges the combustion chamber. By virtue hereof a prolonged combustion with simultaneous enlargement of the combustion chamber is ensured to such an extent that a constant pressure combustion is obtained. Consequently there is a higher pressure over a larger crankshaft angle and therewith a high medium pressure capable of ensuring a good specific efficiency without high peak pressures.

When operating the internal combustion engine as crude oil or truck engine, even a mixture of air with diesel oil, petroleum, kerosene or the like may be sucked in and the ignition may be produced by auto-ignition. The auto-ignition is absolutely possible by virtue of that the piston 25 in co-operation with the counter-piston 26 produces at least 50 atmospheres and 1000° C. A bouncing of the two pistons upon one another is rendered impossible by the gases existing between the same. Thus in the case of such truck engines injection, respectively electric ignition systems may be dispensed with.

By virtue of the possibility of regulation of the spring pressure under which the piston 26 sets back the internal combustion engine according to the invention may, of course, be operated with any desired and available fuel. Thus the invention provides for a multiple fuel engine.

A four-stroke cycle engine with carburetor and a compression of 1:12, operating at a speed of 8000 r.p.m. with a good rate of admission and with a good rate of mechanical efficiency, at one stroke per revolution produces 160 H.P./1000 cm.³. This is the efficiency of the engine according to the invention of a size of 480/480/280 mm., which at the double size of 480/480/500 mm. has about 300 H.P.

The efficiency of 40 H.P. of a known rotary piston internal combustion engine of 250 cm.³, which does not perform a compression of up to 1:12 and which does not have a larger expansion chamber, confirms the above-indicated efficiency of the engine according to the present invention.

The higher total efficiency of the internal combustion engine is the result of

|   | Percent |
|---|---|
| (1) The two-stage compression | about 3–5. |
| (2) The practical absence of any dead space | about 3. |
| (3) The rotary pistons in both the pre-compression and the expansion stage | about 5. |
| (4) The prolonged combustion and expansion | about 3. | the total efficiency thus being increased for about 15%. By virtue hereof the total efficiency of a high speed diesel engine according to the invention is of about 45% i.e. with a fuel consumption of less than 150 g./H.P./h.

It is well known that heavy and expensive diesel engines operating with reciprocating pistons are unable to attain this economy and efficiency. It is also known that the known rotary piston engine referred to in the most advantageous case has at least the double fuel consumption, without taking into consideration its disadvantage consisting in that it does not afford the possibilities of a high compression, of a fuel injection and of a two-stage compression.

The internal combustion engine according to the invention has all the advantages of a conventional diesel engine, which, however, are still improved insofar as by virtue of the above items 1.) to 4.) the fuel consumption of about 160–170 g./H.P./h. of the known diesel engines may still be reduced.

Thus my present invention practically solves the problem of designing and providing a multiple fuel engine which is lighter, smaller and more efficient than the known Otto engines and which is more economical in fuel consumption than the best diesel engines.

What I claim is:

1. A rotary piston internal combustion engine with two stage compression comprising, in combination, a pre-compression stage including a first cylinder having an intake opening and an outlet opening and first rotary piston means in said first cylinder for sucking gas through said inlet opening, compressing the gas in said first cylinder and for discharging compressed gas through said outlet opening during each revolution of said piston means; a main compression stage including a second cylinder, a pair of pistons arranged in said second cylinder for reciprocation toward and away from each other and defining between themselves in said second cylinder a combustion chamber; first passage means providing communication with said outlet opening and the interior of said second cylinder at a portion thereof located in the path of one of said pair of reciprocating pistons so that said first passage means is opened and closed directly by said one piston during reciprocation thereof; an expansion stage including a third cylinder having an inlet opening and an exhaust opening and second rotary piston means in said third cylinder; second passage means providing communication between said inlet opening of said third cylinder and the interior of said second cylinder at a portion thereof located in the path of the other of said reciprocating pistons so that said second passage means is opened and closed during reciprocation of said other piston; a crank shaft operatively connected to said one reciprocating piston; drive means connecting said crank shaft with said first rotating piston means for simultaneous rotation and in such a manner that said first passage means is opened during compression of gas in said first cylinder and during movement of said one reciprocating piston away from the other reciprocating piston and for closing said first passage means during movement of said one reciprocating piston toward the other of said reciprocating pistons; and mechanical means operatively connected to said other reciprocating piston for controlling the movement thereof in dependence of the movement of said one reciprocating piston so as to open said second passage means near the end of the movement of said one piston toward said other piston and for closing said second passage means during movement of said one piston away from said other piston.

2. A rotary piston internal combustion engine with two stage compression comprising, in combination, a pre-compression stage including a first cylinder having an intake opening and an outlet opening and first rotary piston means in said first cylinder for sucking gas through said inlet opening, compressing the gas in said first cylinder and for discharging compressed gas through said outlet opening during each revolution of said piston means; a main compression stage including a second cylinder, a pair of pistons arranged in said second cylinder for reciprocation toward and away from each other and defining between themselves in said second cylinder a combustion chamber; first passage means providing communication with said outlet opening and the interior of said second cylinder at a portion thereof located in the path of one of said pair of reciprocating pistons so that said first passage means is opened and closed directly by said one piston during reciprocation thereof; an expansion stage including a third cylinder having an inlet opening and an exhaust opening and second rotary piston means in said third cylinder; second passage means providing communication between said inlet opening of said third cylinder and the interior of said second cylinder at a portion thereof located in the path of the other of said reciprocating pistons so that said second passage means is opened and closed during reciprocation of said other piston; a crank shaft operatively connected to said one reciprocating piston; drive means connecting said crank shaft with said first rotating piston means for simultaneous rotation and in such a manner that said first passage means is opened during compression of gas in said first cylinder and during movement of said one reciprocating piston away from the other reciprocating piston and for closing said first passage means during movement of said one reciprocating piston toward the other of said reciprocating piston; spring means operatively connected to said other reciprocating piston and tending to move the same toward said one reciprocating piston so that said other piston will move to open said second passage means near the end of the movement of said one piston toward said other piston and for closing said second passage means during movement of said one piston away from said other piston; and limiting means coordinated with said other reciprocating piston for limiting the movement thereof under the action of said spring means toward said one reciprocating piston to an end position in which said other piston closes said second passage means.

3. A rotary piston internal combustion engine with two stage compression comprising, in combination, a pre-compression stage including a first cylinder having an intake opening and an outlet opening and first rotary piston means in said first cylinder for sucking gas through said inlet opening, compressing the gas in said first cylinder and for discharging compressed gas through said outlet opening during each revolution of said piston means; a main compression stage including a second cylinder, a pair of pistons arranged in said second cylinder for reciprocation toward and away from each other and defining between themselves in said second cylinder a combustion chamber; first passage means providing communication with said outlet opening and the interior of said second cylinder at a portion thereof located in the path of one of said pair of reciprocating pistons so that said first passage means is open and closed directly by said one piston during reciprocation thereof; an expansion stage including a third cylinder having an inlet opening and an exhaust opening and second rotary piston means in said third cylinder; second passage means providing communication between said inlet opening of said third cylinder and the interior of said second cylinder at a portion thereof located in the path of the other of said reciprocating pistons so that said second passage means is opened and closed during reciprocation of said other piston; a crank shaft operatively connected to said one reciprocating piston; drive means connecting said crank shaft with said first rotating piston means for simultaneous rotation and in such a manner that said first passage means is opened during compression of gas in said first cylinder and during movement of said one reciprocating piston away from the other reciprocating piston and for closing said first passage means during movement of said one reciprocating piston toward the other of said reciprocating piston; spring means operatively connected to said other reciprocating piston and tending to move the same toward said one reciprocating piston so that said other piston will move to open said second passage means near the end of the movement of said one piston toward said other piston and for closing said second passage means during movement of said one piston away from said other piston; a piston rod connected to said other reciprocating piston and extending away from said one piston through and beyond an end wall of said second cylinder; and stop means on the free end of said piston rod and engaging said end wall during movement of said other piston under the action of said spring toward said one piston for stopping the movement of said other piston toward said one piston at a position in which said other piston closes said second passage means.

4. A rotary piston internal combustion engine with two stage compression comprising, in combination, a pre-compression stage including a first cylinder having an intake opening and an outlet opening and first rotary piston means in said first cylinder for sucking gas through said inlet opening, compressing the gas in said first cylinder and for discharging compressed gas through said outlet opening during each revolution of said piston means; a main compression stage including a second cylinder, a pair of pistons arranged in said second cylinder for reciprocation toward and away from each other and defining between themselves in said second cylinder a combustion chamber; first passage means providing communication with said outlet opening and the interior of said second cylinder at a portion thereof located in the path of one of said pair of reciprocating pistons so that said first passage means is opened and closed directly by said one piston during reciprocation thereof; an expansion stage including a third cylinder having an inlet opening and an exhaust opening and second rotary piston means in said third cylinder; a common shaft for said first and second rotary piston means; second passage means providing communication between said inlet opening of said third cylinder and the interior of said second cylinder at a portion thereof located in the path of the other of said reciprocating pistons so that said second passage means is opened and closed during reciprocation of said other piston; a crank shaft operatively connected to said one reciprocating piston; drive means connecting said crank shaft with said common shaft for simultaneous rotation and in such a manner that said first passage means is opened during compression of gas in said first cylinder and during movement of said one reciprocating piston away from the other reciprocating piston and for closing said first passage means during movement of said one reciprocating piston toward the other of said reciprocating piston; and mechanical means operatively connected to said other reciprocating piston for controlling the movement thereof in dependence of the movement of said one reciprocating piston so as to open said second passage means near the end of the movement of said one piston toward said other piston and for closing said second passage means during movement of said one piston away from said other piston.

5. A rotary piston internal combustion engine with two stage compression comprising, in combination, a pre compression stage including a first cylinder having an intake opening and an outlet opening and first rotary piston means in said first cylinder for sucking gas through said inlet opening, compressing the gas in said first cylinder and for discharging compressed gas through said outlet opening during each revolution of said piston means; a main compression stage including a second cylinder, a pair of pistons arranged in said second cylinder for reciprocation toward and away from each other and defining between themselves in said second cylinder a combustion chamber; first passage means providing communication with said outlet opening and the interior of said second cylinder at a portion thereof located in the path of one of said pair of reciprocating pistons so that said first passage means is opened and closed directly by said one piston during reciprocation thereof; an expansion stage including a third cylinder having an inlet opening and an exhaust opening and second rotary piston means in said third cylinder and comprising a revolving rotor eccentrically arranged in said third cylinder and being formed with a slot extending in substantial radial direction through the whole length of said rotor and a blade located in said slot in sealing engagement with the side faces thereof and engaging with an outer edge face thereof the inner surface of said third cylinder; a common shaft for said first and second rotary piston means, said blade of said second rotary piston means being fixed to said common shaft radially projecting therefrom; second passage means providing communication between said inlet opening of said third cylinder and the interior of said second cylinder at a portion thereof located in the path of the other of said reciprocating pistons so that said second passage means is opened and closed during reciprocation of said other piston; a crank shaft operatively connected to said one reciprocating piston; drive means connecting said crank shaft with said common shaft for simultaneous rotation and in such a manner that said first passage means is opened during compression of gas in said first cylinder and during movement of said one reciprocating piston away from the other reciprocating piston and for closing said first passage means during movement of said one reciprocating piston toward the other of said reciprocating pistons; and mechanical means operatively connected to said other reciprocating piston for controlling the movement thereof in dependence of the movement of said one reciprocating piston so as to open said second passage means near the end of the movement of said one piston toward said other piston and for closing said second passage means during movement of said one piston away from said other piston.

6. An arrangement as defined in claim 5 in which said slot is defined by a pair of opposite surface portions one of which is curved in direction transverse to its elongation to provide for a substantial line contact with a side face of said blade and elongated roller means mounted in said rotor and having a portion protruding beyond the other of said opposite surface portions to provide rolling contact with the other side face of said blade and said blade having at the free end thereof a nose portion projecting in direction of rotation of said blade and having a cross section corresponding substantially to that of a recess formed between said roller means and the adjacent outer surface portion of said slot.

7. A rotary piston internal combustion engine with two stage compression comprising, in combination, a composite engine casing forming a first cylinder having an intake opening and an outlet opening, a second cylinder having an axis transverse to said first cylinder, and a third cylinder having an inlet opening and an exhaust opening and being aligned with said first cylinder along a common axis; first rotary piston means located in said first cylinder and forming therewith a compressing chamber being enlarged and reduced in volume during each revolution of said first rotary piston means for sucking gas through said inlet opening during enlargement of the volume of said compression chamber and for discharging compressed gas through said outlet opening during reduction of the volume in said compression chamber; a pair of reciprocating pistons arranged in said second cylinder for reciprocation toward and away from each other and defining between themselves in said second cylinder a combustion chamber; first passage means providing communication with said outlet opening and the interior of said second cylinder at a portion thereof located in the path of one of said pair of reciprocating pistons so that said first passage means is opened and closed directly by said one piston during reciprocation thereof; an elongated shaft extending along said common axis and being turnably mounted in said composite casing; second rotary piston means in said third cylinder, forming therewith an expansion chamber, and including a revolving rotor eccentrically arranged with respect to said axis and being formed with a substantially radially extending slot extending through the whole length thereof, and a blade keyed to said shaft and extending through said slot in sealing engagement therewith and having an outer edge face in sealing engagement with the inner surface of said third cylinder, said revolving rotor having an annular extension protruding into said first cylinder and said first rotary piston means being eccentrically mounted on said annular extension; second passage means providing communication between said inlet opening of said third cylinder and the interior of said second cylinder at a portion thereof located in the path of the other of said reciprocating pistons so that said second passage means is opened and closed during reciprocation of said other piston; a crank shaft operatively connected to said one reciprocating piston; drive means connecting said crank shaft with said elongated shaft for simultaneous rotation; spring means operatively connected to said other reciprocating piston and tending to move the same toward said one reciprocating piston; and limiting means for limiting the movement of said other reciprocating piston under the action of said spring means toward said one reciprocating piston to an end position in which said other reciprocating piston closes said second passage means so that said other piston is moved against the force of said spring means away from its end position to open said second passage means at the end of the movement of said one piston toward said other piston.

8. An arrangement as defined in claim 7 in which the maximum volume of said expansion chamber is greater than the maximum volume of said compression chamber.

References Cited in the file of this patent

UNITED STATES PATENTS

| | | |
|---|---|---|
| 650,339 | Pederson | May 22, 1900 |
| 995,076 | McGonigle | June 13, 1911 |
| 1,244,529 | Mehle | Oct. 30, 1917 |
| 1,245,154 | Faessler | Nov. 6, 1917 |
| 1,385,880 | Master | July 26, 1921 |
| 2,076,723 | Heinze | Apr. 13, 1937 |
| 2,782,596 | Lindhagen | Feb. 26, 1957 |